(12) United States Patent
Singh

(10) Patent No.: US 9,736,723 B2
(45) Date of Patent: *Aug. 15, 2017

(54) LINK LAYER ASSISTED ROBUST HEADER COMPRESSION CONTEXT UPDATE MANAGEMENT

(71) Applicant: Google Technology Holdings LLC, Mountain View, CA (US)

(72) Inventor: Ajoy K. Singh, Round Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,506

(22) Filed: Jun. 9, 2014

(65) Prior Publication Data

US 2014/0328185 A1 Nov. 6, 2014

Related U.S. Application Data

(63) Continuation of application No. 11/537,670, filed on Oct. 2, 2006, now Pat. No. 8,750,334.

(51) Int. Cl.
*H04W 28/06* (2009.01)
*H04L 29/06* (2006.01)
(Continued)

(52) U.S. Cl.
CPC ........... *H04W 28/065* (2013.01); *H04L 69/04* (2013.01); *H04L 69/22* (2013.01); *H04W 24/08* (2013.01); *H04W 28/04* (2013.01); *H04W 28/06* (2013.01)

(58) Field of Classification Search
CPC ........ H04L 69/04; H04L 69/22; H04W 24/08; H04W 28/04; H04W 28/06; H04W 28/065
(Continued)

(56) References Cited

U.S. PATENT DOCUMENTS

2001/0036154 A1* 11/2001 Takagi .................. H04L 1/1664
370/229
2002/0145990 A1* 10/2002 Sayeedi .............. H04W 76/022
370/335
(Continued)

OTHER PUBLICATIONS

Bormann, C. RFC 3095. "RObust Header Compression (ROHC): Framework and four profiles: RTP, UDP, ESP, and uncompressed" Network Working Group, 2001.*
(Continued)

*Primary Examiner* — Stephen J Clawson
(74) *Attorney, Agent, or Firm* — Lerner, David, Littenberg, Krumholz & Mentlik, LLP

(57) ABSTRACT

A method and system for communicating header compression layer control messages. Header compression control messages are generated by a header compression layer (302) and are sent through at least one link layer data packet by a link transport communications protocol layer (304) to a remote receiver (104). The link transport communications protocol layer (304) monitors receipt of link layer data packet acknowledgements that are received from the link transport communications protocol layer (304) of the remote receiver (104) for the at least one link layer data packet. The link transport communications protocol layer (304) determines successful transmission of the header compression control message and provides, to the header compression layer (302), an indication of successful header compression control message transmission.

14 Claims, 5 Drawing Sheets

(51) Int. Cl.
*H04W 28/04* (2009.01)
*H04W 24/08* (2009.01)

(58) Field of Classification Search
USPC .......................................................... 370/241
See application file for complete search history.

(56) References Cited

U.S. PATENT DOCUMENTS

| | | |
|---|---|---|
| 2003/0026255 A1 | 2/2003 | Poeluev et al. |
| 2003/0123485 A1 | 7/2003 | Yi et al. |
| 2004/0013213 A1* | 1/2004 | Bi ........................ H04B 1/7107 |
| | | 375/350 |
| 2004/0264433 A1 | 12/2004 | Melpignano |
| 2006/0104266 A1 | 5/2006 | Pelletier et al. |
| 2006/0187846 A1* | 8/2006 | Pelletier ................ H04W 28/06 |
| | | 370/252 |
| 2007/0248075 A1 | 10/2007 | Liu et al. |

OTHER PUBLICATIONS

Bormann, C. et al.: Network Working Group, Request for Comments: 3095, Category: Standards Track, Robust Header Compression (ROHC): Framework and four profiles: RTP, UDP, ESP, and uncompressed, Jul. 2001, pp. 1-168.
Comroe, Richard A. et al., ARQ Schemes for Data Transmission in Mobile Radio Systems, Jul. 1984, IEEE Journal on Selected Areas in Communications, vol. Sac-2, No. 4.

* cited by examiner

LINK LAYER ASSISTED ROBUST HEADER COMPRESSION CONTEXT UPDATE MANAGEMENT

CROSS-REFERENCE TO RELATED APPLICATION

The present application is a continuation of U.S. patent application Ser. No. 11/537,670, filed on Oct. 2, 2006, the disclosure of which is incorporated herein by reference.

FIELD OF THE INVENTION

The present invention generally relates to the field of data communications, and more particularly relates to packet data communications protocols using packet header compression.

BACKGROUND OF THE INVENTION

Data communications systems that utilize both wired and wireless data communications standards often transmit data in packetized messages. These packetized messages often include a header portion to contain communications protocol related information. Some protocols incorporate header compression (HC) processing to reduce bandwidth utilization, which is particularly useful with wireless links. For example, a standard implementing a Robust Header Compression (RoHC) protocol is designed to efficiency minimize the size of RTP, UDP and IP headers by compressing dynamic fields of these headers using a window based encoding mechanism. In a wireless access network, RoHC can be used to compress various higher layer protocol headers over the radio link. To enable compression of various protocol headers over the radio link, RoHC is implemented on subscriber equipment (e.g. mobile, CPE, etc) and on a node in an access network. Equipment options for implementing the RoHC processing in access network can either be in the base station or in an external, off-the-shelf, radio access router such as PDSN (Packet Data Serving Node), GGSN (Gatway GPRS Support Node), RNC (Radio Network Controller), ASN-GW (ASN Gateway), and the like. RoHC requires the compressor and the de-compressor to establish and maintain context information that is used for compression and de-compression purposes. The compressor and the de-compressor are required to maintain synchronized context to ensure that the de-compressor is able to correctly de-compress the packets compressed by the compressor. Since the context information is crucial for operation of the RoHC protocol, it is essential to use a reliable context update mechanism between compressor and de-compressor.

The RoHC RFC (3095) defines in-band signaling from de-compressor to compressor to enable efficient encoding as well as quick recovery from over the air packet loss and radio link frame corruption containing compressed headers. The in-band signaling is used by the de-compressor to acknowledge the context update signaling received from the compressor. The explicit acknowledgement signaling mechanism makes the header compression protocol self contained and independent of the underlying link layer but it also introduces additional radio link overhead making it less spectral efficient.

The RoHC protocol uses W-LSB encoding to compress various changing filed of RTP/UDP/IP headers. The W-LSB encoding requires compressor to maintain window of reference points that it uses to compress various changing fields of RTP/UDP/IP header. Depending upon the mode of operation, window size is either manually configured or adjusted based upon explicit feedback from the de-compressor to the compressor. The accuracy of W-LSB de-compression depends upon the reference points being used by compressor being synchronized with those used by the de-compressor for de-compression purpose. In the Robust (R)-mode of operation, the RoHC compressor adjusts its window size as soon as it receives feedback from the de-compressor that a particular context update packet containing a given reference point is received by the de-compressor. In case of either U or O mode, the RoHC compressor manually configures the window size and sends the reference update several times to ensure that de-compressor receives the reference points before it discards the reference point from its compressor window.

Although both of these approaches perform their required functionality, they consume communications bandwidth by requiring transmission of these additional synchronization messages. For example, In the R mode of operation, additional messages are sent from the de-compressor to the compressor to update the window size. In case of U or O modes, the W-LSB window size is chosen in such a way that compressor and de-compressor do not get into situation where their reference points are out of sync. This selection of a larger window size reduces the bandwidth efficiency of W-LSB encoding and thereby reduces some of the spectral efficiency gain that is obtained from using the Robust Header Compression protocol.

Therefore a need exists to overcome the problems with the prior art as discussed above.

SUMMARY OF THE INVENTION

Briefly, in accordance with one aspect of the present invention a method for communicating header compression layer control messages includes sending, by a link transport communications protocol layer to a remote receiver, at least one link layer data packet conveying a header compression control message received from a header compression layer. The method also includes monitoring, at the link transport communications protocol layer, link layer data packet receipt acknowledgements received from the link transport communications protocol layer of the remote receiver for the at least one link layer data packet. The method also includes determining, at the link transport communications protocol layer, successful transmission of the header compression control message. The method also includes providing, to the header compression layer, an indication of successful header compression control message transmission.

In accordance with another aspect of the present invention, a header compression layer control message communications system includes a link transport communications protocol transmitter adapted to send to a remote receiver, according to a link transport communications protocol layer, at least one link layer data packet conveying a header compression control message received from a header compression layer. The header compression layer control message communications system further includes a link transport communications protocol acknowledgement receiver adapted to monitor, at the link transport communications protocol layer, link layer data packet receipt acknowledgements received from a link transport communications protocol layer of the remote receiver for the at least one link layer data packet. The header compression layer control message communications system also includes a header compression control message transmission monitor adapted to determine, at the link transport communications protocol layer, successful transmission of the header compression control message. The header compression layer control message communications system also includes a link transport communications protocol to header compression layer interface adapted to provide, to the header compression layer, an indication of successful header compression control message transmission.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
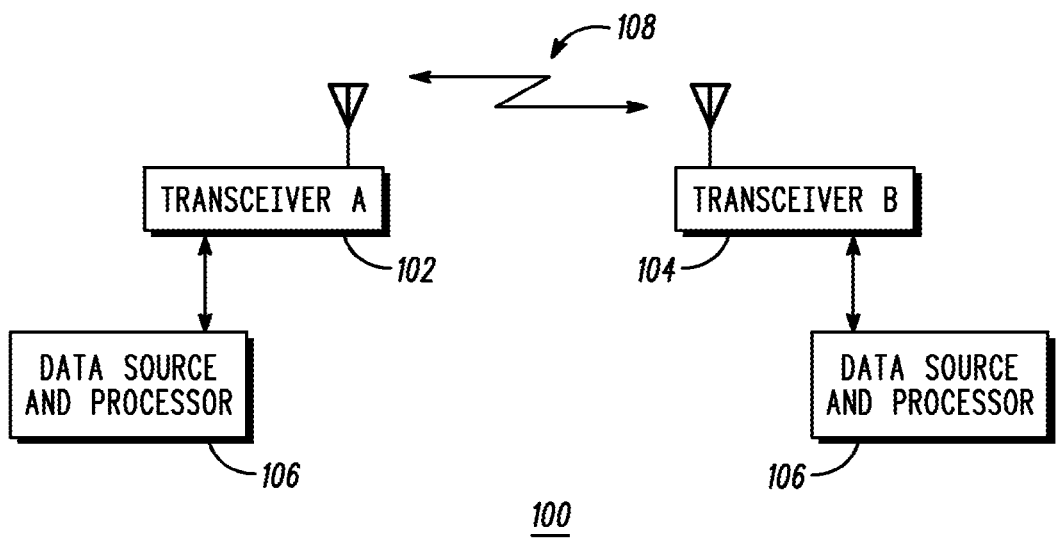
FIG. 1 illustrates a block diagram of a two transceiver communications system in accordance with an embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as illustrative examples for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

One embodiment of the present invention operates to improve spectral efficiency of data communications by using Media Access Control layer triggers to optimize header compression processing and obviating the requirement for the header compression processing to explicitly send acknowledgments for control messages used to coordinate header compression and de-compression processing. One embodiment utilizes conventional window-based least significant bit (W-LSB) data compression techniques to compress fields within message headers. The header compression control messages utilized by one embodiment of the present invention include, for example, header compression context messages, Robust Header Compression Protocol IR (Initialization and Refresh) messages, Robust Header Compression Protocol IR-DYN (Initialization and Refresh dynamic) messages, and Robust Header Compression Protocol Packet Type 2 messages (e.g., UOR-2, UOR-2-ID, UOR-2-TS) and any other context update messages.

The header compression components within the protocol stacks of one embodiment are adapted to interface with a modified ARQ or H-ARQ link layer to perform efficient transmission of header compression control messages. Header compression control messages coordinate and synchronize the operation of the header compression and decompression processing, such as context update. The ARQ/H-ARQ link layer keeps track of which link layer data packets correspond to header compressor control messages and monitors which packets are acknowledged by the receiving transceiver. When all of the link layer data packets that correspond to the header compression control message have been received by the ARQ/H-ARQ link layer, the ARQ/H-ARQ link layer sends a message to the header compression layer indicating successful transmission of that header compression control message. Failure to receive an acknowledgement for any one packet results in a message indication of a failed transmission, which is a negative indication of a successful transmission.

In an example, The Robust header Compression (RoHC) standard RFC3095 defines different levels of robustness where header compression control messages are either acknowledged by a remote header compression layer that receives the control message, or requires several retransmissions of control messages that are not explicitly acknowledged by the receiver. One embodiment of the present invention obviates the requirement for either the explicit header compression layer acknowledgements or retransmissions by providing a verification of receipt for header compression control messages based upon monitoring link layer acknowledgements. A failure of the header compression control message transmission is determined by a failure to receive positive acknowledgement for any one link layer data packet communicating the header compression control message, or by information received in a NACK message for those link layer data packets.

FIG. 1 illustrates a block diagram of a two transceiver communications system 100 in accordance with an embodiment of the present invention. The two transceiver communications system 100 includes a transceiver A 102 and a transceiver B 104 that wirelessly communicate data over a wireless link 108. Transceiver A 102 and Transceiver B 104 each have a transmitter and a receiver that is used to perform wireless communications with each other or with other receivers, transmitters or transceivers. Each of the transceiver A 102 and transceiver B 104 accept data from and provide data to a respective data source and processor 106. The data source and processor 106 of various embodiments are able to include any type of data application, such as a computer communicating data, a bi-directional digital voice telephony system, or any other type of application and/or device that is capable of producing and/or accepting data. Further embodiments operate with data source and processors 106 that either only produce data for transmission over wireless link 108 or only accept data received by a transceiver over the wireless link 108.

Transceiver A 102 and transceiver B 104 of various embodiments are able to communicate over any suitable wireless transmission protocol, such as protocols defined under IEEE 802.16, various digital cellular voice and data networks, and the like. Further embodiments are able to operate over wired networks or any other suitable communications medium able to communicate digital data. As is known to ordinary practitioners in the relevant arts in light of the present discussion, transceivers, such as Transceiver A 102 and Transceiver B 104, include data communications processing that divides communications processing into layers of one or more communications stacks. The processing of such transceivers accepts user data at a highest layer of the communications stack, and the subordinate layers of the communications stack perform various processing to communicate that data to a remote transceiver. Each layer of the communications stack formats the data according to the requirements of that layer. Each layer is also able to communicate control messages to the corresponding communications protocol layer in the remote transceiver.

Figure 2:
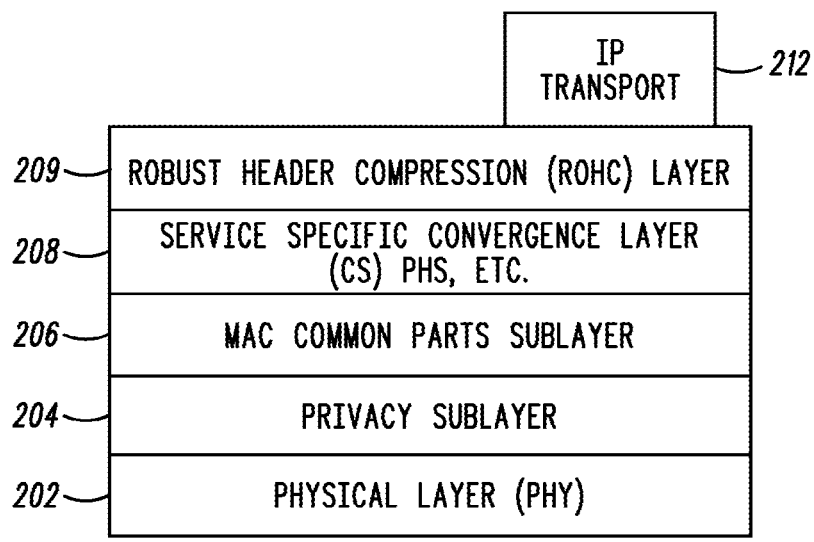
FIG. 2 illustrates a transceiver protocol stack as is utilized by an embodiment of the present invention.

FIG. 2 illustrates a transceiver protocol stack 200 as is utilized by an embodiment of the present invention. The transceiver protocol stack 200 has a physical layer (PHY) 202 that couples to a physical communications medium and performs the processing required to transmit data over a wireless link 108 from a transmitter in a transceiver to a remote receiver within a remote transceiver. The physical layer 202 accepts data for transmission and provides received data to a privacy sublayer 204. The privacy sublayer 204 encrypts/de-crypts packet payload data to provide secure data transmission.

The privacy sublayer 204 in turn accepts data for transmission and provides received data to a Media Access Controller (MAC) common parts sublayer 206. The MAC common parts sublayer 206 provides various MAC level processing to implement the required communications protocols. The MAC common parts sublayer 206 of one embodiment includes an Automatic Repeat Request (ARQ) link layer for the communications protocol being utilized for wireless data communications. Further embodiments of the present invention utilize Hybrid-ARQ, or H-ARQ, protocols and have associated processing in the MAC common parts sublayer 206 to perform the processing required by the H-ARQ protocol. ARQ and H-ARQ communications protocols are known to ordinary practitioners in the relevant arts and operate to communicate link layer data packets over a communications link. Once a receiver receives one or a pre-defined number of data packets, some embodiments transmit an "acknowledgement," or "ACK" packet, from the receiver to the transmitter to indicate receipt of those packets. Some embodiments further support transmission of "Negative Acknowledgement," or "NACK" packets from the receiver to the transmitter to indicate packets that were not properly received. In response to either not receiving an expected ACK packet or receiving a NACK packet, the link layer data packets that were transmitted but not indicated as successfully received are generally retransmitted until a maximum retransmission count is reached. If the transmitted link layer data packets have not be indicated as received, the transmission of those link data packets is then determined to be unsuccessful and the link layer data packet receipts have been failed to be verified.

The MAC common parts sublayer 206 accepts data for transmission and provides received data to a Service Specific Convergence Sublayer (CS) 208. The CS sublayer includes processing to implement, for example, PHS functionality. The CS sublayer 208 accepts data for transmission and provides received data to "Robust Header Compression" (RoHC) sublayer 209 that performs data compression and decompression processing for certain fields of the headers of data messages transmitted over a wireless link 108. The operation of the RoHC layer 209 of one embodiment, and it interaction with the ARQ link transport layer of the MAC Common Parts Sublayer 206, is described in further detail below. The RoHC protocol of one embodiment of the present invention utilizes a Window-based Least Significant Bit (W-LSB) compression algorithm to compress some changing fields in message headers to be communicated to the remote transceiver. The W-LSB compression algorithm is known to ordinary practitioners in the relevant arts.

The RoHC sublayer 209 of one embodiment of the present invention accepts data for transmission from and provides received data to an IP transport layer 212. Further embodiments of the present invention are further able to include an Ethernet convergence sublayer (not shown). The IP transport layer 212 in one embodiment of the present invention exchange data with the RoHC sublayer 209 in a conventional manner. Further embodiments of the present invention exchange data from the RoHC sublayer 209 with other communications processes or entities.

Figure 3:
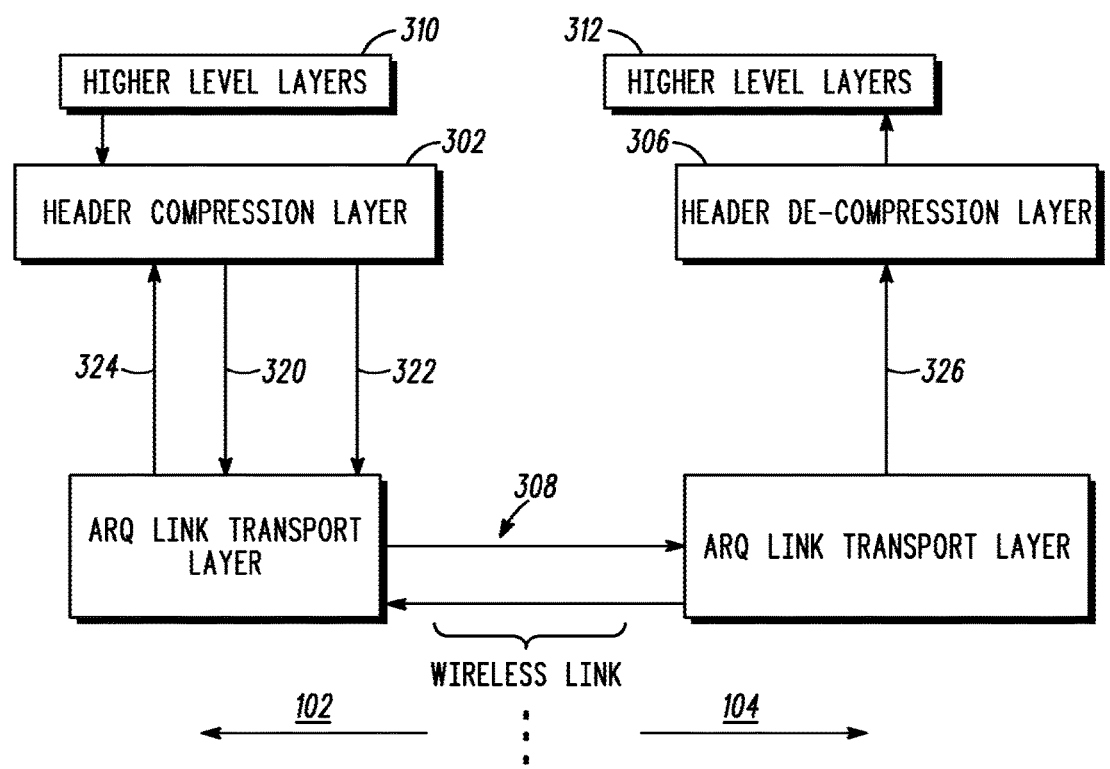
FIG. 3 illustrates a compressed header data message communications flow in accordance with one embodiment of the present invention.

FIG. 3 illustrates a compressed header data message communications flow 300 in accordance with one embodiment of the present invention. The compressed header data message communications flow 300 illustrates communications of data messages with compressed headers from a header compression layer 302 in a transmitting transceiver, such as transceiver A 102, to a header de-compression layer 306 in a receiving transceiver, such as transceiver B 104. The compressed header data messages of this embodiment have some data fields within the message headers compressed by a Window-based Least Significant Bit (W-LSB) compression algorithm. In addition to transmitting data messages with compressed headers between the header compression layer 302 and the header de-compression layer 306, one embodiment of the present invention further communicates header compression control messages from the header compression layer 302 to the header de-compression layer 306 in order to support proper compressed header de-compression. One embodiment of the present invention performs header compression processing, including compression of header information using W-LSB compression algorithms and generation of header compression control messages, in a conventional manner while modifying the communication of receipt acknowledgement processing for some or all of those messages as described below.

The compressed header data message communications flow 300 illustrates a header compression layer 302 that accepts data from a higher level layers 310. The header compression layer 302 forms a data message for transmission to a remote receiver that includes a compressed message header. The header compression layer 302 of one embodiment sends a data message 320 with a compressed header through the intervening layers described above for the transceiver protocol stack 200 to the ARQ link transport layer 304.

In order to support synchronization of compressor and de-compressor context information, the header compression layer 302 generates header compression control messages 322 with appropriate context information that are to be sent to the header de-compression layer 306. The header compression control messages 322 are first provided to the ARQ link transport layer 304 of the sending transceiver for transmission to the receiving transceiver over the physical communications layer, which couples to the physical communications medium of a wireless link 308, through the ARQ link transport communications protocol stack.

The ARQ link transport layer 304 of the exemplary embodiment performs conventional ARQ link communications processing to send data from the ARQ link transport layer 304 of one transceiver to the ARQ link transport layer 304 of a remote transceiver. As is known by ordinary practitioners in the relevant arts, ARQ link transport layer 304 is able to accept a data message from the header compression layer 302 and divide that accepted message into multiple link layer data packets for transmission over the physical layer 202, including over the wireless link 308. A receiving ARQ link transport layer 304 will send an acknowledgement message indicating which link layer data packets have been successfully received.

In order to support proper processing by the ARQ link transport layer 304, the header compression layer 302 precedes each header compression control message or data message with compressed header with a notification message containing information about the message to be provided to ARQ link transport layer 304. This notification allows the sending ARQ link transport layer 304 to identify which transmitted link layer data packets correspond to a particular header compression control message or data message with compressed header. The sending ARQ link transport layer 304 is then able to correlate link layer data packets transmitted over the physical layer, including the wireless link 308, to a respective message received from the header compression layer 302. The ARQ link transport layer 304 is then able to correctly monitor the acknowledgements or negative acknowledgements sent through the physical communications layer for those transmitted link layer data packets. This to verify receipt of link layer data packet receipt acknowledgements from the remote receiver for each link layer data packet transmitted, thereby determining if the entire header compression control message or data message with compressed header has been properly received. If the entire transmission has been successfully received, the transmitting ARQ link transport layer 304 provides a positive indication of successful message transmission to the header compression layer 302 that serves as an acknowledgement of the receipt of the message sent by the header compression layer 302. If not all of the link layer data packets transmitted by the ARQ link transport layer 304 for a particular header compression control message or data message with compressed header are not properly acknowledged by the receiving ARQ link transport layer, the transmitting ARQ link transport layer 304 fails to verify receipt of link layer data packet receipt acknowledgements for all link layer data packets and therefore provides a negative indication of successful message transmission to the header compression layer 302. Link layer data packets received by the receiving ARQ link transport layer 304 are provided to a header de-compression layer 306, which performs the decompression processing for the header, and then produces the data to higher level layers 312. Header compression control messages are also provided to the header de-compression layer 306 and processed to control the internal operation of the header de-compression layer 306.

Figure 4:
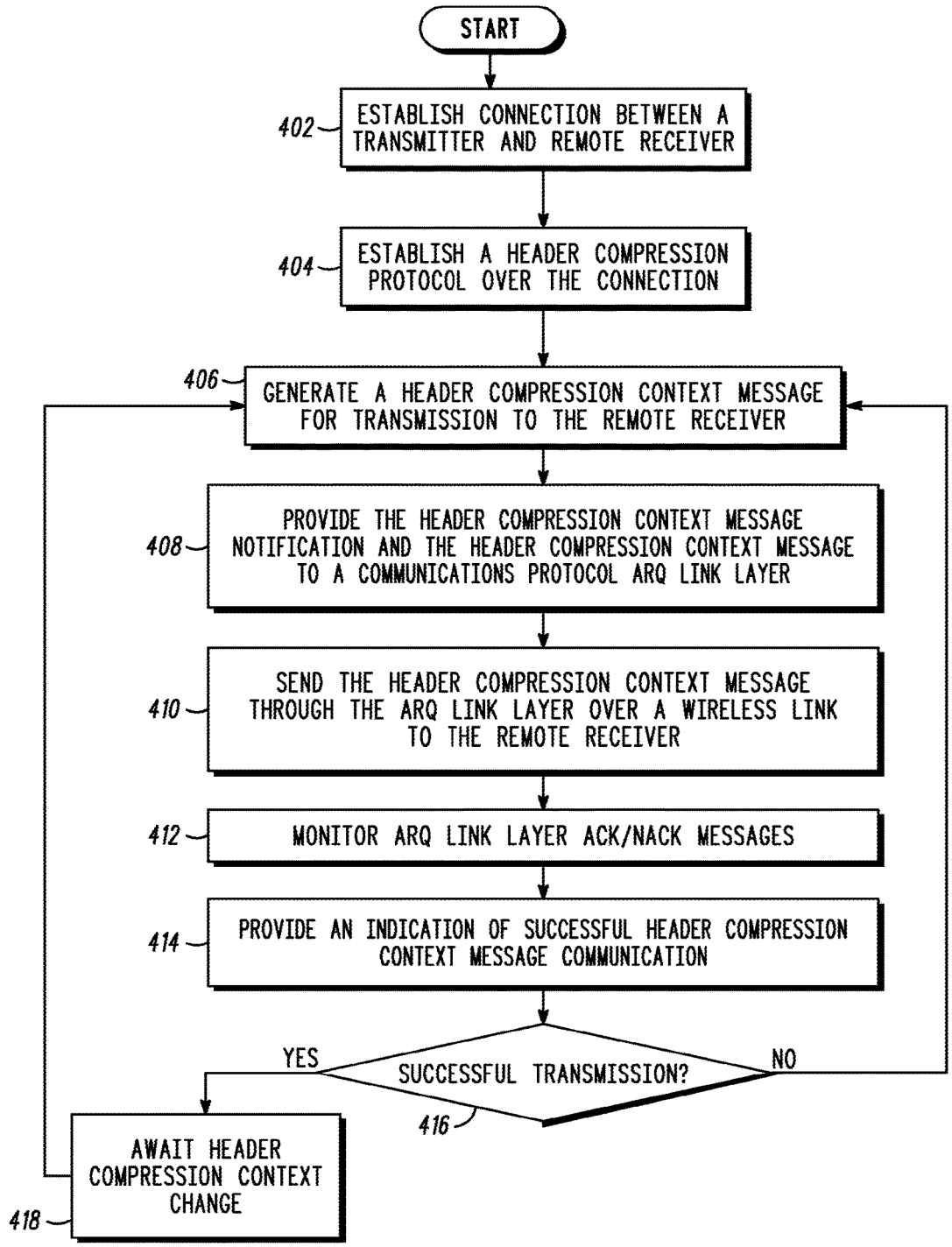
FIG. 4 illustrates a header compression transmission processing flow in accordance with one embodiment of the present invention.

FIG. 4 illustrates a header compression transmission processing flow 400 in accordance with one embodiment of the present invention. The header compression transmission processing flow 400 begins by establishing, at step 402, a connection between a transmitter, such as transceiver A 102, and a remote receiver, such as transceiver B 104. The processing then proceeds to establishing, at step 404, a header compression protocol over the established connection.

Once a header compression protocol is established between the transmitter and the remote receiver, the processing proceeds to generating, at step 406, a header compression context message at the transmitter for transmission to the remote receiver. The contents of this header compression context message in one embodiment of the present invention comply with a definition of a header compression context message defined for a conventional header compression protocol. The processing proceeds by providing, at step 408, a header compression context message notification along with the header compression context message to a communications protocol ARQ link transport layer. The header compression context message notification that is provided to the ARQ link transport layer 304 specifies, for example, a PID, message type, payload, and the like. The header compression context message notification allows the ARQ link transport layer processing to track which link layer data packets sent by the ARQ link transport layer are part of the header compression context message After the ARQ link transport layer has received the header compression context message, the processing advances to sending, at step 410, the header compression context message through the ARQ link transport layer over a wireless link to the remote receiver. The ARQ link transport layer 304 generally divides the header compression context message into a number of link layer data packets for transmission over the wireless link.

The processing then proceeds to monitoring and receiving, at step 412, ARQ transport link layer ACK/NACK messages from a remote receiver's ARQ link transport layer 304. These ACK/NACK messages are sent to indicate the receipt of each transmitted link layer data packet. The processing of the ARQ transport link layer 304 of one embodiment of the present invention tracks the receipt status for each link layer data packet associated with each header compression context message based upon ACK and/or NACK messages received from a remote receiver's ARQ link transport layer.

After all of the ARQ link layer data packets have been successfully received or the ARQ link transport layer processing determines that the transmission of any ARQ link transport layer packet has failed, the processing provides, at step 414, an indication of successful header compression context message communications to the header compression layer 302. This indication is able to be positive or negative. The processing next determines, at step 416, if the transmission was successful. If the transmission was not successful, the processing retransmits the header compression context message by returning to the header compression layer's 302 generating, at step 406, the header compression context message. A particular header compression communications protocol implemented by various embodiments of the present invention is able to adjust or delay the generation, and subsequent retransmission, of the header compression context message according to that protocol's requirements. If the transmission was successful, as determined at step 416, the processing awaits, at step 418, a context change within the ARQ link transport layer. After a context changes within the ARQ link transport layer, the processing returns to generating, at step 406, a header compression context message for transmission to the remote receiver, as described above.

Figure 5:
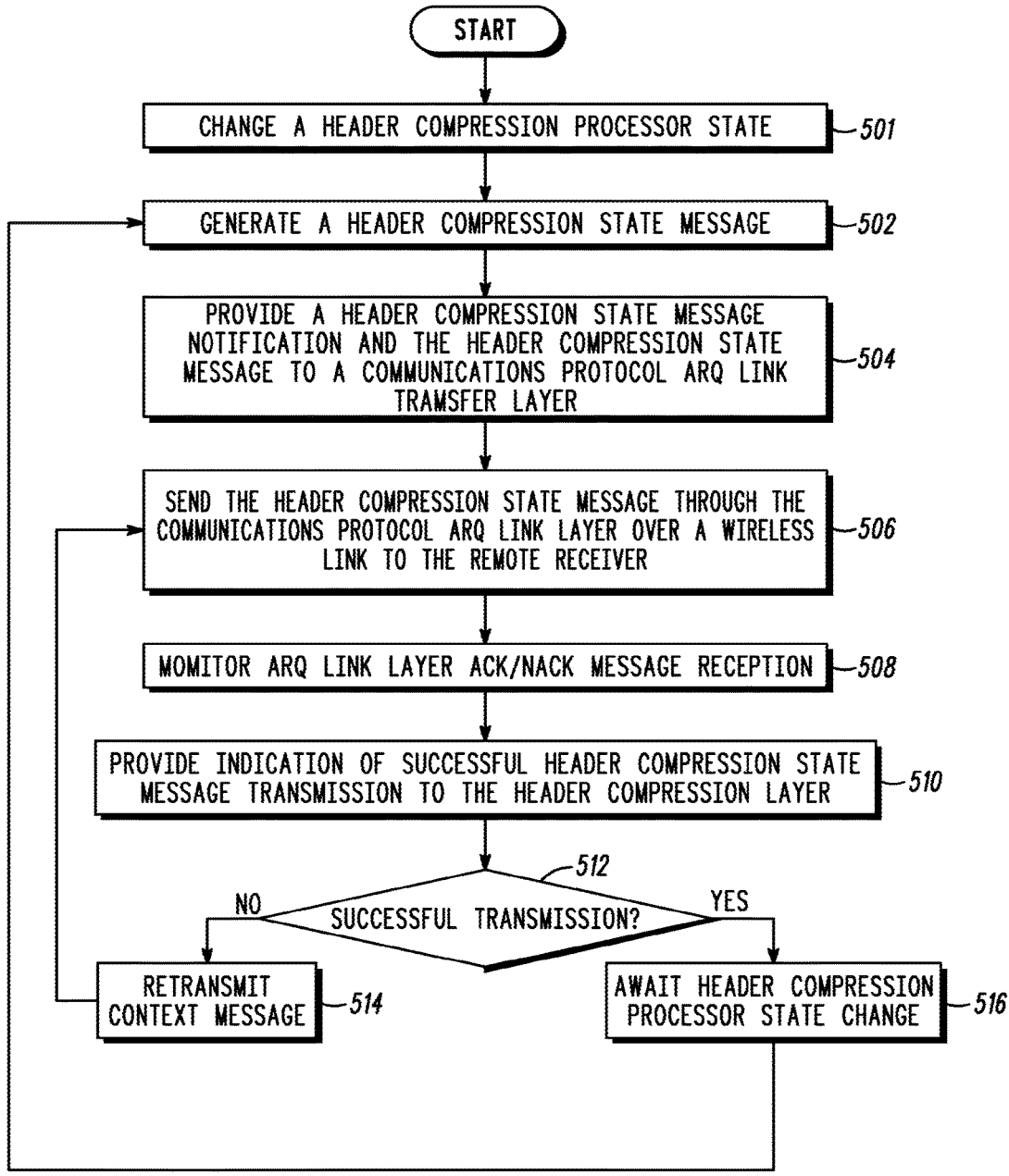
FIG. 5 illustrates a header compression state message transmission processing flow in accordance with one embodiment of the present invention.

FIG. 5 illustrates a header compression state message transmission processing flow 500 in accordance with one embodiment of the present invention. The header compression state message processing flow 500 begins by changing, at step 501, a header compression processor state within the header compression layer 302. The processing continues by creating, at step 502, a header compression state message within a header compression layer, such as within the header compression layer 302. The processing then continues by providing, at step 504, a header compression state message notification and the header compression state message to a communications protocol ARQ link transport layer 304.

In a manner similar to that discussed above with regards to the compressed header context message, The ARQ link transport layer 304 is able to divide header compression state messages into multiple ARQ link layer data packets for transmission over the wireless link 308. In order to support determining successful transmission of the header compression state message, the ARQ link transport layer 304 accepts a header compression state message notification that specifies, in one example, a PID, message type, payload, and the like. The header compression state message notification allows the ARQ link transport layer 304 to correlate the ARQ link layer data packets with a particular header compression state message.

The processing then continues by sending, at step 506, the header compression state message through the communications protocol ARQ link transport layer over a wireless link to the remote receiver. As described above, this transmission is able to involve multiple ARQ link layer data packets for each header compression state message. The ARQ link transport layer 304 of one embodiment of the present invention monitors, at step 508, ARQ link transport layer ACK/NACK message reception from the remote receiver to determine the transmission success for the transmitted header compression state message. The processing then provides, at step 510, an indication, which is either positive or negative, to the header compression layer 302 of the successful header compression state message transmission.

The processing next determines, at step 512, if the transmission was successful. If the transmission was successful, the processing continues by awaiting, at step 516, a change of state of the header compression processor. Once a state changes within the header compression processor, the processing returns to creating, at step 502, a header compression state message that reflects this changed state. If the transmission was not successful, the processing configures for retransmission, at step 514, of the header compression state message transmission. The processing then returns to sending, at step 506, the header compression state message through the communications protocol ARQ link layer over a wireless link to the remote receiver.

Figure 6:
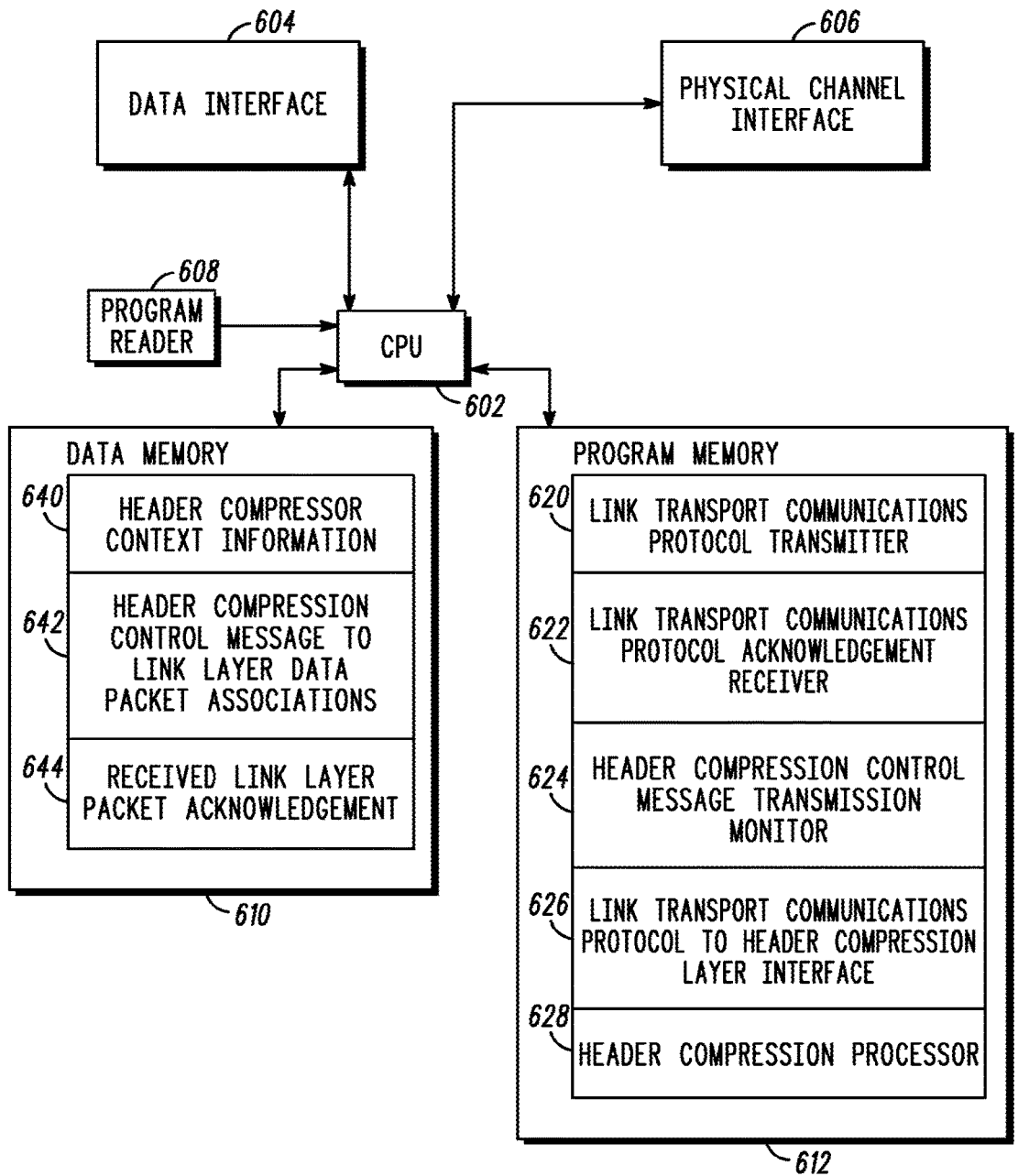
FIG. 6 illustrates a block diagram of a communications processor as is included in the transceiver A and transceiver of FIG. 1, in accordance with one embodiment of the present invention.

FIG. 6 illustrates a block diagram of a communications processor 600 as is included in the transceiver A 102 and transceiver B 104 of FIG. 1, in accordance with one embodiment of the present invention. The communications processor 600 in this example performs the communications related processing of these transceivers. In addition to the header compression control message processing described below, the communications processor 600 of one embodiment of the present invention further performs the other communications processing as required by the various protocols implemented by the transceiver.

The programmable signal processor 600 includes a CPU 602 that performs the programmed processing defined by processing programs, as is described below. The CPU 602 of some embodiments of the present invention are able to include programmable microprocessors, pre-configured or reconfigurable gate arrays, and/or any other suitable signal processing hardware capable of being configured or re-configured to perform pre-programmed or re-programmable tasks. The CPU 602 accepts data to be transmitted and provides received data through a data interface 604. Data Interface 604 provides an interface in one embodiment to a data source and processor 106. The CPU 602 provides data to and accepts data from a physical channel interface 606. The physical channel interface exchanges data with physical channel equipment which, for example, transmits and/or receives data through a wired or wireless physical communications channel to a remote receiver, transmitter, or transceiver.

The CPU 602 further accepts a computer program product that is encoded on a physical media that is ready by program reader 608. Program reader 608 reads a computer readable medium to extract a computer program, and provides that computer program to CPU 602 to be encoded into program memory 612, described in more detail below.

The communications processor 600 includes a program memory 612 that stores programs that define the processing defined for the CPU 602. The program memory 612 of one embodiment of the present invention includes a link transport communications protocol transmitter program 620 that is adapted to send to a remote receiver, according to a link transport communications protocol layer, at least one link layer data packet conveying a header compression control message received from a header compression layer. The link transport communications protocol transmitter is also adapted to send to the remote receiver, according to a link transport communications protocol layer, a second at least one link layer data packet conveying to the second header compression control message. The link transport communications protocol transmitter is further adapted to divide the header compression control message into a plurality of link layer data packets, and associate each link layer data packet within the plurality of link layer data packets with the header compression control message.

The program memory 612 further includes a link transport communications protocol acknowledgement receiver program 622 that is adapted to monitor, at the link transport communications protocol layer, link layer data packet receipt acknowledgements received from a link transport communications protocol layer of the remote receiver for the at least one link layer data packet. The link transport communications protocol acknowledgement receiver is also adapted to monitor by verifying receipt of link layer data packet receipt acknowledgements from the remote receiver for each link layer data packet within the plurality of link layer data packets.

The program memory 612 further includes a header compression control message transmission monitor program 624 that is adapted to determine, at the link transport communications protocol layer, successful transmission of the header compression control message. The header compression control message transmission monitor is further adapted to monitor, at the link transport communications protocol layer, link layer data packet receipt acknowledgements received from the link transport communications protocol layer of the remote receiver for the second at least one link layer data packet.

The program memory 612 further includes a link transport communications protocol to header compression layer interface program 626 that is adapted to provide, to the header compression layer, an indication of successful header compression control message transmission. The link transport communications protocol to header compression layer interface is further adapted to provide, to the header compression layer, an indication of successful second header compression control message transmission. The link transport communications protocol to header compression layer interface is additionally adapted to provide, from the link transport communications protocol layer in response to verifying receipt of link layer data packet receipt acknowledgements for all link layer data packets within the plurality of link layer data packets, a positive indication of successful header compression control message transmission, and to provide, from the link transport communications protocol layer in response to failing to verify receipt of link layer data packet receipt acknowledgements for all link layer data packets within the plurality of link layer data packets, a negative indication of successful header compression control message transmission.

The program memory 612 further includes a header compression processor program 628 adapted to implement, subsequent to the link transport communications protocol to header compression layer interface providing the indication, a header compression layer state change, and generate, in response to the header compression layer state change, a second header compression control message reflecting the header compression layer state change.

The communications processor 600 includes a data memory 610. Data memory 610 stores data that support processing performed by CPU 602. The data memory 610 of one embodiment of the present invention includes header compressor context information 640. The header compressor context information of one embodiment of the present invention includes conventional Robust Header Compression (RoHC) context information. The data memory 610 also includes header compression control message to link layer data packet associations 642 and received link layer packet acknowledgements 644. As described above, the link transport layer processing associates with each header compression control message the link layer packets conveying that message. The received link layer packet acknowledgements are received, which are stored in the received link layer packet acknowledgement 644, are used to determine if the header compression control message was fully received, as is described above.

The present invention may also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, Flash memory, Disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A method for communicating header compression layer control messages, the method comprising:
monitoring, at a communication processor implementing a link transport communications protocol layer at a first communication device, link layer data packet receipt acknowledgements received from a link transport communications protocol layer of a remote receiver for at least one link layer data packet, the at least one link layer data packet conveying a header compression control message;
determining, at the communication processor implementing the link transport communications protocol layer at the first communication device, by the monitoring of the link layer data packet receipt acknowledgements received from the remote receiver, successful transmission of the header compression control message;
providing, by the communication processor to a header compression layer at the first communication device, an indication of successful header compression control message transmission according to the monitored link layer data packet receipt acknowledgements;
upon the indication of successful transmission, performing a header compression context change within the link transport communications protocol layer; and
generating, by the header compression layer in response to the header compression context change, a new header compression control message for transmission to the remote receiver.

2. The method of claim 1, wherein the header compression control message comprises at least one of a Robust Header Compression Protocol IR message, a Robust Header Compression Protocol IR-DYN message, a Robust Header Compression Protocol Packet Type 2 message, a Robust Header Compression Protocol UOR-2 message, a Robust Header Compression Protocol UOR-2-ID message, a Robust Header Compression Protocol UOR-2-TS message, and a Robust Header Compression Protocol R-0-CRC message.

3. The method of claim 1, wherein the communication processor implements one of an automatic repeat request protocol and a hybrid automatic repeat-request protocol.

4. The method of claim 1, wherein the method further comprises:
generating, in response to a header compression layer state change, a second header compression control message reflecting the header compression layer state change;
monitoring link layer data packet receipt acknowledgements received from the link transport communications protocol layer of the remote receiver for a second at least one link layer data packet;
determining successful transmission of the second header compression control message; and
providing, to the header compression layer, an indication of successful second header compression control message transmission.

5. The method of claim 1, wherein the providing comprises:
providing, in response to verifying receipt of the link layer data packet receipt acknowledgements for all link layer data packets within a plurality of link layer data packets, a positive indication of successful header compression control message transmission; and
providing, in response to failing to verify receipt of the link layer data packet receipt acknowledgements for all link layer data packets within the plurality of link layer data packets, a negative indication of successful header compression control message transmission.

6. The method of claim 1, wherein the method further comprises, upon the indication of successful transmission, performing a header compression layer state change by the header compression layer including creating a header compression state message indicating the changed state.

7. A header compression layer control message communications system, comprising:
memory configured to store a link transport communication protocol acknowledgement receiver program, a header compression control message transmission monitor program, and a link transport communications protocol to header compression layer interface program; and
a communication processor operatively coupled to the memory;
the communication processor being configured to execute the link transport communications protocol acknowledgement receiver program to monitor, at a link transport communications protocol layer at a first communication device, link layer data packet receipt acknowledgements received from a link transport communications protocol layer of a remote receiver for at least one link layer data packet, the at least one link layer data packet conveying a header compression control message;
the communication processor being configured to execute the header compression control message transmission monitor program to determine, at the link transport communications protocol layer at the first communication device, successful transmission of the header compression control message by the monitoring of the link layer data packet receipt acknowledgements received from the remote receiver;
the communication processor being configured to execute the link transport communications protocol to header compression layer interface program to provide, to a header compression layer at the first communication device, an indication of successful header compression control message transmission; and
the communication processor being further configured to:
upon the indication of successful transmission, perform a header compression context change; and
generate, in response to the header compression context change, a new header compression control message for transmission to the remote receiver.

8. The header compression layer control message communications system of claim 7, wherein the header compression control message comprises at least one of a Robust Header Compression Protocol IR message, a Robust Header Compression Protocol IR-DYN message, a Robust Header Compression Protocol Packet Type 2 message, a Robust Header Compression Protocol UOR-2 message, a Robust Header Compression Protocol UOR-2-ID message, a Robust Header Compression Protocol UOR-2-TS message, and a Robust Header Compression Protocol R-0-CRC message.

9. The header compression layer control message communications system of claim 7, wherein the communication processor implements one of an automatic repeat request protocol and a hybrid automatic repeat-request protocol.

10. The header compression layer control message communications system of claim 7, wherein the header compression layer control message communications system further comprises:
a header compression processor configured to generate, in response to a header compression layer state change, a second header compression control message reflecting the header compression layer state change,
wherein the system is further configured to monitor link layer data packet receipt acknowledgements received from the link transport communications protocol layer of the remote receiver for a second at least one link layer data packet; and
the communication processor is further configured to provide, to the header compression layer, an indication of successful second header compression control message transmission.

11. The header compression layer control message communications system of claim 7, wherein the communication processor is further configured to:
provide, in response to verifying receipt of link layer data packet receipt acknowledgements for all link layer data packets within a plurality of link layer data packets, a positive indication of successful header compression control message transmission; and
provide, in response to failing to verify receipt of link layer data packet receipt acknowledgements for all link layer data packets within the plurality of link layer data packets, a negative indication of successful header compression control message transmission.

12. A header compression layer control message communications system, comprising one or more processors configured to:
implement a link transport communications protocol transmitter program to send at least one link layer data packet from a first communication device to a remote receiver, the at least one link layer data packet conveying a header compression control message received from a header compression layer at the first communication device;
implement a link transport communications protocol acknowledgement receiver program at the first communication device to monitor link layer data packet receipt acknowledgements received from a link transport communications protocol layer of the remote receiver for the at least one link layer data packet;

implement a header compression control message transmission monitor program at the first communication device to determine successful transmission of the header compression control message by the monitoring of the link layer data packet receipt acknowledgements received from the remote receiver; and implement a link transport communications protocol to header compression layer interface program to provide an indication of successful header compression control message transmission to a header compression layer at the first communication device;

wherein the one or more processors are further configured to:

upon the indication of successful transmission, perform a header compression context change via the link transport communications protocol acknowledgement receiver program; and generate via the header compression control message transmission monitor program, in response to the header compression context change, a new header compression control message for transmission to the remote receiver.

13. The header compression layer control message communications system of claim 12, further comprising a data interface configured to accept data to be transmitted and provide data that has been received to a data source and processor unit.

14. The system of claim 12, wherein the system is further configured, upon the indication of successful transmission, to perform a header compression layer state change including creating a header compression state message indicating the changed state.

* * * * *